J. CASS.
DRAG FOR PLANTERS.
APPLICATION FILED SEPT. 13, 1919.

1,345,532.

Patented July 6, 1920.

Inventor,
Joseph Cass, by
G. C. Kennedy,
Attorney.

UNITED STATES PATENT OFFICE.

JOSEPH CASS, OF DELAWARE TOWNSHIP, DELAWARE COUNTY, IOWA.

DRAG FOR PLANTERS.

1,345,532.   Specification of Letters Patent.   Patented July 6, 1920.

Application filed September 13, 1919. Serial No. 323,522.

*To all whom it may concern:*

Be it known that I, JOSEPH CASS, a citizen of the United States of America, and a resident of Delaware township, Delaware county, Iowa, have invented certain new and useful Improvements in Drags for Planters, of which the following is a specification.

My invention relates to improvements in drags for planters, and the object of my improvement is to furnish simple, inexpensive and effective means for smoothing the surface of the soil after the passage of a wheeled planter, or the like, leveling up tracks made by the wheels and thereby preventing formation of channels along said tracks or depressions, especially on sloping surfaces.

Figure 1:
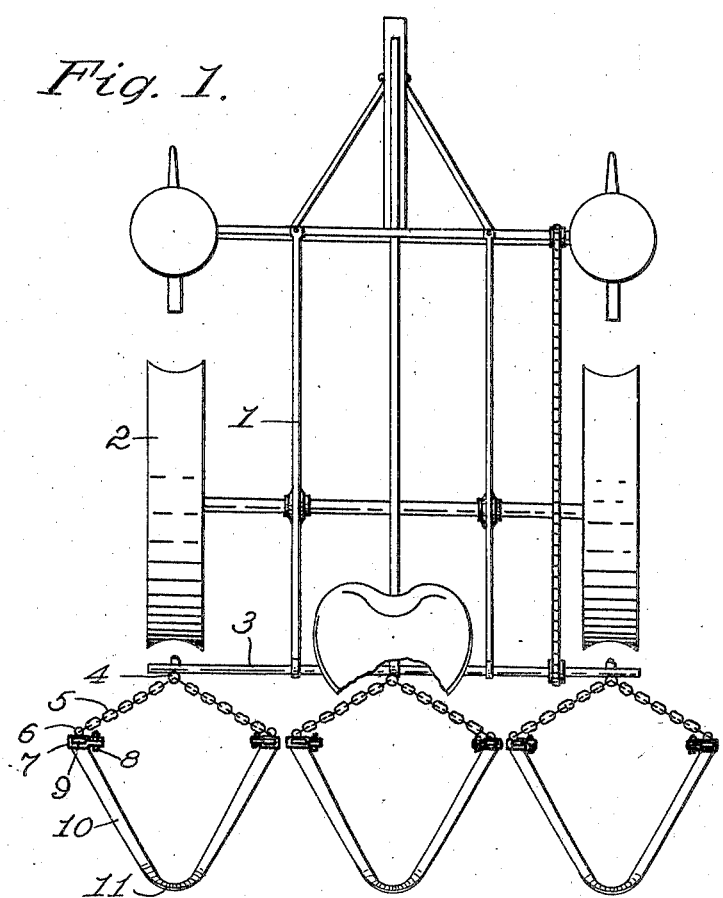
Figure 2:
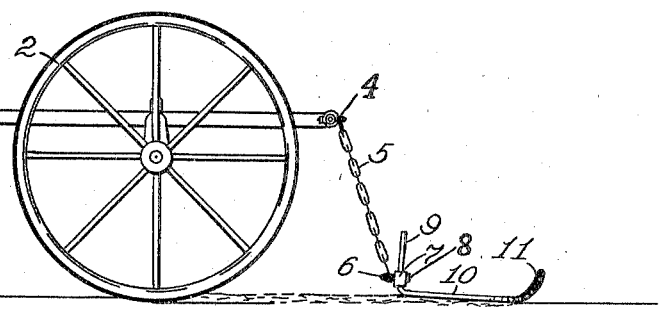

This object I have accomplished by the means which are hereinafter described and claimed, and which are illustrated in the accompanying drawings, in which Figure 1 is a plan view of a planter, with parts omitted or removed, having connected thereto a plurality of my improved drag devices, and Fig. 2 is a side elevation of the rear part only of said planter, showing one of said devices connected thereto in an adjusted position.

Similar numerals of reference denote corresponding parts throughout the several views.

The numeral 1 denotes a skeleton frame of a corn planter mounted on carrying-wheels 2, and having a transverse bar 3 mounted across its rear end fixedly. I have shown three of my improved drags positioned in transverse alinement immediately to the rear of said planter and connected to said rear bar 3 by means of flexible linking connections 5 connected to eye-bolts 4 passed through the bar. Each device consists of a bar 10 bent medially in V-shape having its vertex preferably rounded and curved upwardly also at 11. The end parts 9 of the diverging members 10 are bent upwardly at a right angle to said members. The numeral 7 denotes an adjustable clamp, which is formed from a single bar bent into loop shape mounted on the end part 9 and made slidably adjustable thereon, having its end parts secured together by a bolt 8. A ring or eye 6 is fixed on each clamp 7 and a short length of chain 5 or other relatively movable linking-means is connected between each eye 6 and the adjacent eye-bolt 4.

As shown in Fig. 1, three of said drags 10 are alined transversely behind the planter, two of them being immediately to the rear of the carrying wheels 2. The middle drag may be dispensed with as its office is to space the other drags apart while removing any roughnesses in the soil, such as hoof prints, which may occur in the middle of the space traversed by the planter. As the members 10 are divergent, their action besides smoothing, is to draw some of the loose surface soil together into and level up the depressions in the soil left by the wheels 2. On side-hills, especially, rain is apt to coarse down the channels afforded by the wheel depressions which not only hastens denudation of the soil from such slopes, but also uncovers the seed previously planted in the line of said depressions.

The clamps 7 may be adjusted vertically along the upwardly projecting parts 9 of the drags which will cause more or less tilting of the members 10 whereby the curved vertices 11 are allowed to more or less engage the soil according to the condition of the latter, to engage and propel parts of the soil into the depressions. The raised vertices 11 also receive and drag forward clods diverted to them by the converging members 10, dragging the clods forward until they are worn down and distributed.

The forms of these drags may be varied and other means of adjustment employed, without departing from the invention.

Having described my invention, what I claim as new, and desire to secure by Letters Patent, is:

1. A drag for a planter or other vehicle, comprising a V-shaped bar having its vertex bent upwardly, and a draft-connection connected adjustably to the extremities of the members of said bar for vertical adjustment thereof.

2. In a drag for a planter or other vehicle, a V-shaped bar with rounded and upwardly-directed vertex and with upwardly-directed extremities.

3. A drag for a planter or other vehicle, comprising a medially bent bar the end parts of whose members are bent upwardly, and a draft connection adjustably secured to said upwardly bent parts to tiltingly adjust and support said bar relative to the surface traversed by it.

4. A drag for a planter or other vehicle, comprising a medially bent horizontally positioned bar the end parts of whose members are bent upwardly, and whose medial bent part is bent upwardly, a draft-connection, and clamping-means adjustably mounted on the upwardly bent end parts of said members for adjustment therealong and connected to said draft-connection.

Signed at Waterloo, Iowa, this 14th day of Aug. 1919.

JOSEPH CASS.